US010752044B2

(12) United States Patent
Power (10) Patent No.: US 10,752,044 B2
(45) Date of Patent: Aug. 25, 2020

(54) IN LINE MANUFACTURING OF DOCUMENTS WITH SECURITY ELEMENTS (71) Applicant: Innovia Security Pty Ltd, Craigieburn, Victoria (AU)

(72) Inventor: Gary Fairless Power, Craigieburn (AU)

(73) Assignee: CCL Secure Pty Ltd, Craigieburn, Victoria (AU)

( * ) Notice: Subject to any disclaimer, the term of this patent is extended or adjusted under 35 U.S.C. 154(b) by 0 days.

(21) Appl. No.: 15/311,403

(22) PCT Filed: Apr. 22, 2015

(86) PCT No.: PCT/AU2015/050186
§ 371 (c)(1),
(2) Date: Nov. 15, 2016

(87) PCT Pub. No.: WO2015/172189
PCT Pub. Date: Nov. 19, 2015

(65) Prior Publication Data
US 2017/0080742 A1 Mar. 23, 2017

(30) Foreign Application Priority Data

May 15, 2014 (AU) ................................ 2014100504
May 15, 2014 (AU) ................................ 2014901805

(51) Int. Cl.
*B42D 25/41* (2014.01)
*B42D 25/36* (2014.01)
(Continued)

(52) U.S. Cl.
CPC ............... *B42D 25/41* (2014.10); *B41M 3/14* (2013.01); *B42D 25/324* (2014.10);
(Continued)

(58) Field of Classification Search
CPC .... B42D 25/41; B42D 25/391; B42D 25/328; B42D 25/351; B42D 25/42; B41M 3/14;
(Continued)

(56) References Cited

U.S. PATENT DOCUMENTS 5,421,779 A * 6/1995 Castro ................. B42D 15/025
283/100
7,989,055 B2 8/2011 Keller et al.
(Continued)

FOREIGN PATENT DOCUMENTS

WO 2007113640 10/2007
WO WO 2008076785 A1 * 6/2008 .............. B41M 3/14
(Continued)

OTHER PUBLICATIONS

International Search Report for PCT/AU2015/050186 dated Jul. 20, 2015.
(Continued)

*Primary Examiner* — Justin V Lewis
(74) *Attorney, Agent, or Firm* — Christopher M. Scherer; DeWitt LLP (57) ABSTRACT

A method and apparatus for in-line manufacture of a security document with a structured security element is provided in which a continuous web of document substrate is fed through a series of processing stations. The processing stations include a station for forming a structured security element in a radiation sensitive coating applied to the document substrate, and at least one station for applying at least one additional layer to the document substrate excluding the security element area. In a security document manufactured with the method or apparatus, the additional layer or layers have a combined thickness which is preferably substantially equal to the height of the structured security
(Continued)

element or which differs from the height of the structured security element by a predetermined amount.

28 Claims, 2 Drawing Sheets

(51) Int. Cl.
    *B42D 25/391*     (2014.01)
    *B41M 3/14*     (2006.01)
    *G03H 1/00*     (2006.01)
    *B42D 25/425*     (2014.01)
    *B42D 25/42*     (2014.01)
    *B42D 25/45*     (2014.01)
    *B42D 25/324*     (2014.01)
    *B42D 25/351*     (2014.01)
    *B42D 25/328*     (2014.01)
    *B42D 25/364*     (2014.01)
    *G03H 1/02*     (2006.01)

(52) U.S. Cl.
    CPC ......... *B42D 25/328* (2014.10); *B42D 25/351* (2014.10); *B42D 25/36* (2014.10); *B42D 25/364* (2014.10); *B42D 25/391* (2014.10); *B42D 25/42* (2014.10); *B42D 25/425* (2014.10); *B42D 25/45* (2014.10); *G03H 1/0011* (2013.01); *G03H 1/0248* (2013.01); *G03H 1/0252* (2013.01); *G03H 1/0272* (2013.01); *G03H 2250/14* (2013.01); *G03H 2250/35* (2013.01); *G03H 2260/12* (2013.01); *G03H 2260/61* (2013.01); *G03H 2270/31* (2013.01)

(58) Field of Classification Search
    CPC .. G03H 1/0248; G03H 1/0011; B03H 1/0252; B03H 1/0272
    USPC .......................... 283/70, 72, 86, 94, 98, 901
    See application file for complete search history.

(56) References Cited

U.S. PATENT DOCUMENTS

| | | |
|---|---|---|
| 2010/0040811 A1 | 2/2010 | Sarnataro |
| 2011/0175345 A1 | 7/2011 | Xu et al. |
| 2013/0069360 A1 | 3/2013 | Power et al. |
| 2014/0110931 A1* | 4/2014 | Richert .................. B41M 3/148 283/85 |

FOREIGN PATENT DOCUMENTS

| | | | |
|---|---|---|---|
| WO | 2011017749 | 2/2011 | |
| WO | WO-2011017749 A1 * | 2/2011 | ............... G07D 7/12 |

OTHER PUBLICATIONS

Written Opinion for PCT/AU2015/050186 dated Jul. 20, 2015.
Office Action for Swedish Application No. 1651635-3 dated Jun. 18, 2019.

* cited by examiner

IN LINE MANUFACTURING OF DOCUMENTS WITH SECURITY ELEMENTS

CROSS REFERENCE TO RELATED APPLICATIONS

The present application is the U.S. national stage application of International Application PCT/AU2015/050186, filed Apr. 22, 2015, which international application was published on Nov. 19, 2015, as International Publication WO2015/172189. The International Application claims priority of Australian Patent Application No. 2014100504, filed May 15, 2014, and Australian Patent Application No. 2014901805, filed May 15, 2014, the contents of which are incorporated herein by reference in their entireties.

FIELD OF THE INVENTION

The invention relates to documents with security elements used as an anti-counterfeiting measure. In particular the invention relates to documents with integral security elements and a method and apparatus for the 'in line' manufacture of these security documents.

BACKGROUND OF THE INVENTION

The use of security elements is well established in the field of security documents. One such type of security element is an optically variable device (OVD) which is a security feature or device that changes in appearance. OVDs provide an optically variable effect when the banknote is tilted and/or when the viewing angle of the observer relative to the OVD changes. The image of an OVD may also be changed by aligning a verification device over the security feature or device. An OVD may be provided by a printed area, e.g. an area printed with metallic inks or iridescent inks, by an embossed area, and by a combination of a printed and embossed feature. An OVD may also be provided by a diffractive device, such as a diffraction grating or a volume hologram and may include arrays of microlenses and lenticular lenses.

Lens-based security devices are a type of optically variable device (OVD). A description of cylindrical microlenses arranged in a lenticular array to make an OVD is provided in 'Optical Document Security', 3rd Edition by Rudolf L. Van Renesse ISBN 1-58053-258-6, pages 162 and 163, published 2005. The lenticular array is a series of cylindrical microlenses moulded in a polymer substrate. The microlens array can be placed on printed images and indicia such that when viewed from different angles, different images of the underlying indicia are seen. This technology can also be used with spherical or part-spherical microlenses and micro-images to produce magnified images by moire magnification, and to give an illusion of depth or movement as the underlying image is viewed from various angles.

Security elements, such as microlens arrays and other types of OVDs, such as diffraction gratings and volume holograms, are usually made separately from the remainder of the security document and subsequently applied to the document substrate to complete the security document. For example the OVDs are formed as a repeating pattern in a polymer substrate and wound into a roll. Then, in a completely separate process, the OVDs are applied to a designated area on the remainder of the security document.

Unfortunately, microlens structures and other types of security elements which have a structured surface, such as volume holograms, necessarily have a height or profile that gives the security document a significant localised increase in thickness. Typically the thickness can increase by about 30% or more in the area occupied by the security device. This localised thickness increase compounds when the security documents are stacked on top of each other. Similarly, if the security element is applied to a continuous web of the security documents and subsequently wound into a roll, the roll quickly develops a large eccentricity which generates downstream problems in the production process. The distortion in the roll causes some slack areas in the web and areas of excessive tension in the web where the web may burst or shows signs of "pressure blocking". Pressure blocking occurs where two surfaces are brought into close contact with each other under pressure and, as a result of pressure surface entanglement or Van der Waal forces, the level of adhesion between the surfaces increases to such an extent that a significant force is required to part them. On occasion the force can exceed the cohesive strength of the two surfaces resulting in rupturing one or more of the surfaces.

If the security documents are a stack of separate sheets, the thickness variation in the stack creates complications when the sheets are fed or delivered through a sheet transport system. If the security document is a bank note, then a stack of the notes in a cash issuing and processing machine will form a wedge shape which limits the number of notes that can be processed at any one time. Portions of the stack can be regularly rotated 180° in order to produce a stack that is flatter. However, if the OVD is around the middle of the note, turning sections of the stack tends to be less effective at flattening the stack.

Wedge-shaped stacks limit the number of notes that can be processed at one time and increase processing costs. Rotating the notes within a stack introduces complexity and complications with note authentication. Furthermore, the production of the OVDs separately from the remainder of the document substantially increases the production costs relative to a security document compared with a type of security device that can be formed in a single 'in line' manufacturing process.

SUMMARY OF THE INVENTION

According to a first aspect, the present invention provides a method of manufacturing a security document with a structured security element, wherein the method comprises:
(a) providing a document substrate having a first surface on one side and an second surface on the opposite side;
(b) applying a radiation sensitive coating to a security element area on the first surface of the document substrate;
(c) forming the security element in the radiation coating, the security element having a structure extending to a height from the first surface;
(d) applying one or more additional layers to the first surface of the substrate, excluding the security element area;
(e) wherein the one or more additional layers have a combined thickness which differs from the height of the security element structure by less than 50% of the height of the security element structure and/or by less than 10 μm.

The combined thickness of the additional layer or layers is preferably substantially equal to the height of the security element structure. Where the combined thickness of the additional layer or layers differs from the height of the security element structure, the difference is preferably less than 20%, more preferably less than 15%, and even more preferably less than 10% of the height of the security element structure. In a particularly preferred embodiment, the predetermined amount is less than 5 µm.

Preferably, the method of manufacturing the security document further includes: providing the document substrate as a continuous web; and feeding the web through a series of processing stations in a machine direction for application of the radiation sensitive coating, for forming the security element in the radiation sensitive coating, and for the application of the one or more additional layers such that the continuous web with the security element and the additional layers is collected downstream of the processing stations in a substantially cylindrical roll.

According to a second aspect, the present invention provides apparatus for manufacturing a security document with a structured security element comprising a series of processing stations including: a substrate feeding station for feeding a continuous web of document substrate having a first surface on one side and a second surface on its opposite side; a station for applying a radiation sensitive coating to a security element area on the first surface of the document substrate; a security element forming station for forming a structured security element in the radiation sensitive coating, the security element comprising a structure extending to a height from the first surface; and a station for applying one or more additional layers to the first surface of the substrate, excluding the security element area, wherein the one or more additional layers have a combined thickness which differs from the height of the security element structure by less than 50% of the height of the security element structure and/or by less than 10 µm.

One or more of the processing stations in the method or apparatus may include a roller assembly. The radiation sensitive coating is preferably applied by a coating applying roller only in the security element area. The station for applying the one or more additional layers may also include one or more rollers for applying one or more additional layers in the form of at least one opacifying layer to the first surface in a printing or laminating process.

The radiation sensitive coating is preferably applied by a printing process, such as flexographic printing; gravure printing; or silkscreen printing.

The radiation sensitive coating may be an embossable, radiation-curable coating which can be embossed to form a security element having a relief structure, such as a diffractive structure or a lens structure. In this case, an embossing station for embossing the security element structure and a curing station for curing the radiation-curable coating are provided. The curing station for curing the radiation-curable coating is preferably provided at the embossing station, so that the embossed structure of the security element is cured at substantially the same time as the curable coating is embossed.

Preferably the radiation-curable coating is a UV-curable coating, such as a UV-curable, epoxy based coating.

Alternatively, other forms of embossable curable coatings and curing systems may be used, such as electron-beam (EB) curable coatings, or cationic curing coatings.

Preferably the curable coating is embossed via contact with a security element applying roller. Preferably the curable coating is liquid prior to contact with the security element applying roller. In the case of a UV-curable coating, the embossed coating is exposed to UV radiation incident on the second surface which may be transmitted through the translucent or transparent polymer layer.

Preferably the security element roller has a cylindrical embossing surface completely covered with a repeating security element structure pattern. Optionally the cylindrical embossing surface is engraved with discrete formations shaped to correspond with the shape of the discrete security element on the security document. Preferably a cylindrical embossing surface of the security element applying roller is engraved using a diamond stylus of suitable cross-section. Optionally the cylindrical embossing surface of the security element applying roller is provided by a metal shim wrapped around a support surface on the roller.

Alternatively, or additionally, the radiation sensitive coating may be a photo-sensitive coating which can be irradiated with radiation of a suitable range of wavelengths to form a security element, such as a volume hologram, a polarising security device or a liquid crystal security device. In this case, a radiation source for irradiating the radiation sensitive coating is provided.

The first surface of the document substrate may be subjected to an adhesion promoting process prior to application of the radiation sensitive coating. Optionally, the adhesion promoting process is selected from: flame treatment; corona discharge treatment; and plasma treatment.

The method may further include applying an adhesion promoting layer or a primer layer to the first surface of the document substrate prior to applying the radiation sensitive coating. Preferably the adhesion promoting layer raises the surface energy of the first surface by at least five dynes more than the surface energy of the adhesion promoting layer. In a further preferred form, the surface energy of the first surface is raised at least ten dynes more than that of the adhesion promoting layer. The adhesion promoting layer may comprise one or more of: a UV-curing layer; a solvent based layer; and a water based layer. Preferably, the adhesion promoting layer is dried before the radiation sensitive coating is applied.

In one embodiment, the security element structure comprises at least one focussing element. The at least one focussing element may be an array of microlenses, although other forms of focussing elements, such as diffractive lenses, Fresnel lenses and zone plates may be provided to form the security element structure.

The at least one focussing element may be an array of cylindrical or part cylindrical lenses. The cylindrical or part-cylindrical lenses may extend substantially parallel to one another or in a plurality of different directions. Alternatively, the at least one focussing element may be a microlens array in which the lens structures are spherical, part-spherical or aspherical microlenses. Optionally, the security element structure may be a microlens array in which the lens structures are a combination of cylindrical or part-cylindrical microlenses and spherical, part-spherical or aspherical microlenses.

In another embodiment, the security element comprises a diffractive structure, such as a diffraction grating, or a hologram. A diffraction grating may be formed by embossing a radiation-curable coating in similar manner to forming an embossed lens structure.

In a further embodiment, the security element structure may be formed by irradiating the radiation sensitive coating with patterned radiation. In this embodiment, the radiation sensitive coating may be a photopolymer.

A volume hologram may be formed by applying the radiation sensitive coating using a printing and/or embossing process, and irradiating the radiation sensitive material with patterned radiation configured for recording the volume hologram within the radiation sensitive coating. Our Australian Provisional Application No. 2014901478 entitled Volume Holograms for Security Documents filed on 24 Apr.

2014 describes one such method for producing a volume hologram in a structured security document. The radiation sensitive material is preferably a printable photopolymer.

In a further embodiment, the security element comprises a polarising device. A polarising device may be formed by applying a radiation sensitive coating which is irradiated with patterned radiation for applying the polarising device within the radiation sensitive coating. In this embodiment, the radiation sensitive coating may be a photopolymer, or a photosensitive liquid crystal layer.

A protective coating may be applied to the security element structure at a further processing station downstream of the station for forming the security element structure in the radiation sensitive layer. A protective coating is particularly required when the security element is a diffractive structure or a hologram. The protective coating is preferably substantially transparent so that it does not affect the optical properties of the security element.

Optionally, one or more second surface coatings are applied to the second surface. Optionally, the additional coatings are translucent or transparent. Optionally, the additional coatings include at least one layer that is pigmented and applied as indicia to be viewed on the security document. Optionally the one or more additional coatings include a layer that is contiguous across the first surface except for the security element area.

In one preferred embodiment, a printed layer is applied to the second surface of the document substrate in an area corresponding to the security element area on the first surface, wherein the printed layer has indicia forming part of an image to be viewed through the security element.

According to another aspect of the invention there is provided a security document made by the method of the first aspect of the invention.

According to a further aspect of the invention, there is provided a security document comprising: a document substrate having a first surface on one side and a second surface on the opposite side; a security element positioned on a security element area of the first surface, the security element having a structure that extends to a height from the first surface; and one or more additional layers on the first surface of the document substrate, but excluding the security element area; wherein the one or more additional layers have a combined thickness which differs from the height of the security element structure by less than 50% of the height of the security element structure and/or by less than 10 μm.

The combined thickness of the additional layer or layers is preferably substantially equal to the height of the security element structure. Where the combined thickness of the additional layer or layers differs from the height of the security element structure, the difference is preferably less than 20%, more preferably less than 15%, and even more preferably less than 10% of the height of the security element structure. In a particularly preferred embodiment, the difference is less than 5 μm.

In one embodiment, the security element structure comprises at least one focussing element. The at least one focussing element may be an array of microlenses, although other forms of focussing elements, such as diffractive lenses, Fresnel lenses and zone plates may be provided to form the security element structure.

The at least one focussing element may be an array of cylindrical or part cylindrical lenses. The cylindrical or part-cylindrical lenses may extend substantially parallel to one another or in a plurality of different directions. Alternatively, the at least one focussing element may be a microlens array in which the lens structures are spherical, part-spherical or aspherical microlenses. Optionally, the security element structure may be a microlens array in which the lens structures are a combination of cylindrical or part-cylindrical microlenses and spherical, part-spherical or aspherical microlenses.

In another embodiment, the security element comprises a diffractive structure, such as a diffraction grating, a hologram or a volume hologram.

In a further embodiment, the security element comprises a polarising device and/or a liquid crystal device.

Preferably, the document substrate is formed from a transparent or translucent polymeric material, such as biaxially oriented polypropylene. The additional layer or layers applied to the first surface of the substrate are preferably opacifying layers which are omitted in the security element area to form a window of half window area that contains the security element. The opacifying layers are preferably opacifying coatings of ink which may be applied in a printing process. Alternatively, the additional layer or layers may be layers of a substantially opaque material, such as paper or opaque plastics material that is laminated or otherwise secured to the substrate.

In one embodiment, the security element area is in the form of a stripe across the security document. Optionally the security element area is a discrete region of the security document. Optionally the discrete region is in the form of a graphical design.

Preferably the security document further comprises a printed layer applied to the second surface in an area corresponding to the security element area on the first surface wherein the printed layer has indicia forming part of an image to be viewed through the security element. Where the security element is an array of focussing elements, the printed indicia may comprise an array of corresponding microimages.

Preferably, the security document is a banknote.

Skilled workers in this field will readily appreciate that the invention allows for the production of security documents with security element structures, such as optically variable devices (OVDs), via an in line manufacturing process rather than the separate or parallel processes discussed in the background section. When printing security documents such as banknotes, the production volumes are very high and strongly favour printing onto a continuous web between a feed roller and a collection roller. By producing the entire security document including the security element structure in accordance with the present invention allows for in line manufacturing by eliminating the non-cylindrical roll forming on the collection roller. In light of this, the single in line manufacturing process provides significant time and cost efficiencies in the production of the security documents. Furthermore, the present invention provides for in line manufacturing of a security element structure in a shape which is not merely a simple stripe or basic geometric patch, but potentially a more exotic and intricate shape.

The in line manufacturing technique of the present invention allows for the layers around the security element structure to be built up, thereby substantially reducing or eliminating any localised increases in the document thickness. It will be appreciated that localised decreases in thickness, such as within a window or half window opening in the second surface layers, do not cause the problems associated with localised thickness increases.

The in line process of the invention also allows the security element structure to be positioned in accurate registration with other features of the security document. This further raises the technological challenges faced by would-be counterfeiters.

Security Document or Token

As used herein the term security documents and tokens includes all types of documents and tokens of value and identification documents including, but not limited to the following: items of currency such as banknotes and coins, credit cards, cheques, passports, identity cards, securities and share certificates, driver's licenses, deeds of title, travel documents such as airline and train tickets, entrance cards and tickets, birth, death and marriage certificates, and academic transcripts.

The invention is particularly, but not exclusively, applicable to security documents or tokens such as banknotes or identification documents such as identity cards or passports formed from a substrate to which one or more layers of printing are applied.

Security Element

As used herein the term security device or feature includes any one of a large number of security devices, elements or features intended to protect the security document or token from counterfeiting, copying, alteration or tampering. Security devices or features may be provided in or on the substrate of the security document or in or on one or more layers applied to the base substrate, and may take a wide variety of forms, such as security threads embedded in layers of the security document; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) such as diffractive devices including diffraction gratings, holograms, volume holograms and diffractive optical elements (DOEs).

Substrate

As used herein, the term substrate refers to the base material from which the security document or token is formed. The base material may be paper or other fibrous material such as cellulose; a plastic or polymeric material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials.

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from a substantially opaque material, such as paper or fibrous material, with an insert of transparent plastics material inserted into a cut-out, or recess in the paper or fibrous substrate to form a transparent window or a translucent half-window area.

Embossable Curable Ink

The term embossable curable ink used herein refers to any ink, lacquer or other coating which may be applied to the substrate in a printing process, and which can be embossed while soft to form a relief structure and cured to fix the embossed relief structure. The curing process does not take place before the curable ink is embossed, but it is possible for the curing process to take place either after embossing or at substantially the same time as the embossing step. The curable ink is preferably a radiation curable ink curable by radiation, such as ultraviolet (UV) radiation. Alternatively, the radiation curable ink may be cured by other forms of radiation, such as electron beams or X-rays.

The radiation curable ink is preferably a transparent or translucent ink formed from a clear resin material. Such a transparent or translucent ink is particularly suitable for printing light-transmissive security elements such as sub-wavelength gratings, transmissive diffractive gratings and lens structures.

In one particularly preferred embodiment, the transparent or translucent ink preferably comprises an acrylic based UV curable clear embossable lacquer or coating.

Such UV curable lacquers can be obtained from various manufacturers, including Kingfisher Ink Limited, product ultraviolet type UVF-203 or similar. Alternatively, curable embossable coatings may be based on other curing systems, such as EB curing systems or cationic curing systems.

The radiation curable inks and lacquers used herein have been found to be particularly suitable for embossing microstructures, including diffractive structures such as diffraction gratings and holograms, and microlenses and lens arrays. However, they may also be embossed with larger relief structures, such as non-diffractive optically variable devices.

The ink is preferably embossed and cured by ultraviolet (UV) radiation at substantially the same time. In a particularly preferred embodiment, the radiation curable ink is applied and embossed at substantially the same time in a Gravure printing process.

Preferably, in order to be suitable for Gravure printing, the radiation sensitive coating has a viscosity falling substantially in the range from about 20 to about 175 centipoise, and more preferably from about 30 to about 150 centipoise. The viscosity may be determined by measuring the time to drain the lacquer from a Zahn Cup #2. A sample which drains in 20 seconds has a viscosity of 30 centipoise, and a sample which drains in 63 seconds has a viscosity of 150 centipoise.

With some polymeric substrates, it may be necessary to apply an intermediate layer to the substrate before the radiation sensitive coating is applied to improve the adhesion of the embossed structure formed by the ink to the substrate. The intermediate layer preferably comprises a primer layer, and more preferably the primer layer includes a polyethylene imine. The primer layer may also include a cross-linker, for example a multi-functional isocyanate. Examples of other primers suitable for use in the invention include: hydroxyl terminated polymers; hydroxyl terminated polyester based co-polymers; cross-linked or uncross-linked hydroxylated acrylates; polyurethanes; and UV curing anionic or cationic acrylates. Examples of suitable cross-linkers include: isocyanates; polyaziridines; zirconium complexes; aluminium acetylacetone; melamines; and carbodiimides.

BRIEF DESCRIPTION OF THE DRAWINGS

The invention will now be described by way of example only with reference to the accompanying drawings, in which.

DETAILED DESCRIPTION OF THE PREFERRED EMBODIMENTS

Figure 1:
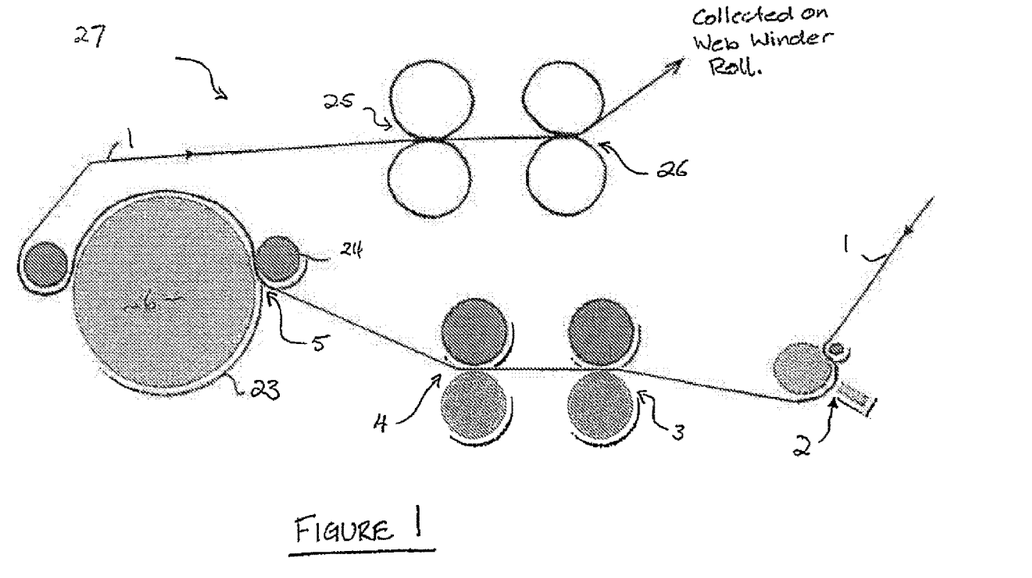
FIG. 1 is a schematic representation of apparatus for in line manufacturing of a security document with a security element structure.

Referring to FIG. 1, apparatus 27 for in line manufacture of the security documents is schematically shown. A continuous web of translucent or transparent material such as polypropylene, PET or the like is subject to an adhesion promoting process at a first processing station 2 including a roller assembly. Suitable adhesion promoting processes are flame treatment, corona discharge treatment, plasma treatment or similar. The adhesion promoting process raises the surface energy of the security document substrate 1 such that the energy of a first surface 11 (see FIG. 2) is more than 5 and preferably more than 10 dynes greater than that of an adhesion promoting layer that is next applied to the first surface 11 of the document substrate 1.

An adhesion promoting layer 28 is applied at a second processing station 3 including a roller assembly. A suitable adhesion promoting layer is one specifically adapted for the promotion of adhesion of UV curable coatings to polymeric surfaces. The adhesion promoting layer may have a UV curing layer, a solvent-based layer, a water-based layer or any combination of these. Preferably, the adhesion promoting layer has a primer layer that typically includes a polyethylene ionine. The primer layer may also include a cross linker, for example a multifunctional isocyanate. Examples of suitable primers for use with the present invention include: hydroxyl terminated polymers; hydroxyl terminated polyester based co-polymers; cross-lined or uncross-linked hydroxylated acrylates; polyurethanes; and UV curing anionic or cationic acrylates. Examples of suitable cross-linkers include: isocyanates; polyaziridines; zirconium complexes; aluminium acetylacetone; melamines; and carbodiimides.

The type of primer is selected to best suit the radiation sensitive coating for forming the security element. The selected primer should not substantially affect the optical properties of the security element 17; 37 (FIGS. 2 and 3) that is eventually formed.

At a third processing station 4, which also includes a roller assembly, the radiation sensitive coating, is applied to the dried surface of the adhesion promoting layer 28. The radiation sensitive coating can be applied via flexographic printing, gravure printing or a silk screen printing process.

The radiation sensitive coating is only applied to the security element area 22 (see FIGS. 2 and 3) on the first surface 11 where the OVD 16 is to be positioned. The security element area 22 can take the form of a stripe, a discrete patch in the form of a simple geometric shape or in the form of a more complex graphical design.

While the radiation sensitive coating is still liquid, it is processed to form the security element structures 17; 37 (shown in FIGS. 2 and 3) at a fourth processing station 5.

In one embodiment, processing station 5 includes an embossing roller 6. Embossing roller 6 has a cylindrical embossing surface 23 for embossing an security element structure, such as a lens structure 17 (FIG. 2) into a radiation sensitive coating in the form of a UV curable ink. The cylindrical embossing surface 23 has surface relief formations corresponding to the shape of the security element structure to be formed. In one embodiment, the surface relief formations can orient microlenses 17 in the machine direction, transverse to the machine direction, or in multiple directions at any angle to the machine direction. The microlenses 17 may be cylindrical, part-cylindrical, spherical, part-spherical, aspherical or an alternative design, or indeed a combination of various types of microlens structures. Alternatively, the cylindrical embossing surface 23 of the embossing roller 6 may have surface relief formations for embossing a diffractive structure, or other embossed OVD structure, into the UV curable ink.

The cylindrical embossing surface 23 of the embossing roller 6 may have a repeating pattern of surface relief formations or the relief structure formations may be localised to individual shapes corresponding to the shape of the security element area 22 on the document substrate 1. The embossing roller 6 may have the surface relief formations formed by a diamond stylus of appropriate cross section, or the surface relief formations may be provided by at least one metal shim provided on the embossing roller 6. The at least one metal shim may be attached via adhesive tape, magnetic tape, clamps or other appropriate mounting techniques.

The UV curable ink on the substrate is brought into intimate contact with the cylindrical embossing surface 23 of the embossing roller 6 by a UV roller 24 at processing station 5 such that the liquid UV curable ink flows into the surface relief formations of the cylindrical embossing surface 23. At this stage, the UV curable ink is exposed to UV radiation transmitted though the substrate layer 1. The UV radiation may be transmitted through the surface of the UV roller 24. The UV roller 24 preferably has internal UV lamps and a roller surface that is UV transparent in at least some areas.

By careful selection of the UV curable materials and/or the radiation source it is possible to create the security element structure at a later stage of the in line manufacturing process. The radiation intensity must be sufficient to penetrate all layers between the UV curable ink and the radiation source. For example, it is possible to use E-beam curing or metal doped microwave discharge lamps as the radiation source. Alternatively, the UV curable ink may include a photo initiator that is tuned to absorb the emissions from an appropriate light source.

The UV cylinder 24 and the embossing cylinder 6 may use a registration device to accurately register the radiation sensitive coating with the security element area 22 on the document substrate 1. A suitable method for accurate registration of the embossing cylinder with the radiation sensitive coating in the designated security element area 22 on the substrate 1 is described in greater detail in WO 2008/031170 to the present applicant.

With the security element structure 17 applied to the document substrate 1, one or more additional layers are applied at a downstream processing station including further roller assemblies 25 and 26. The additional layers may be clear or pigmented coatings and applied as a partial coating, as a contiguous coating or a combination of both. In one preferred method, the additional layers are opacifying layers which are applied to one or both surfaces of the substrate 1 except in the region of the security element structure.

Figure 2:
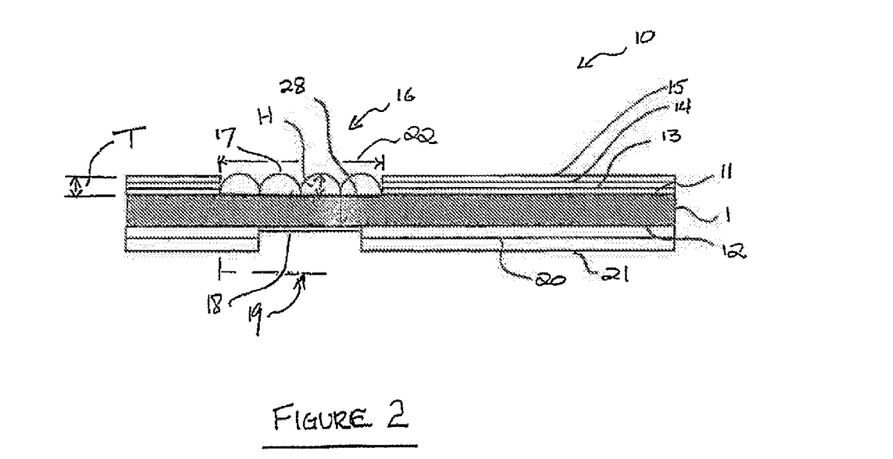
FIG. 2 is a schematic cross-section of a security document with a security element structure in the form of a lens-based security device.

FIG. 2 schematically shows a security document 10 formed with an embossed security element structure 17 in the form of a lens structure having an array of microlenses manufactured in accordance with the method of the invention. The security document comprises a transparent substrate of polymeric material, preferably biaxially oriented polypropylene (BOPP), having a first surface 11 and a second surface 12. Opacifying layers 13, 14 and 15 are applied to the first surface having a combined total thickness T. The opacifying layers are omitted in a window area 16 where the security element structure 17 is applied to the first surface 11. The microlenses of the embossed security element structure 17 have a height H.

In a preferred embodiment, the combined thickness T of the opacifying layers 13, 14 and 15 is preferably substantially equal to the height H of the security element structure 17. Where there is any difference between the height H of the embossed security element structure 17 and the combined thickness T of the opacifying layers 13, 14 and 15, the difference is less than 50%, preferably less than 20%, more preferably less than 15%, and even more preferably less than 10% of the height of the security element structure. The difference is preferably less than 10 µm. In a particularly preferred embodiment, the difference is less than 5 µm.

As shown in FIG. 2, opacifying layers 20, 21 applied to the second surface 12 on the opposite side of the substrate 1 are omitted in a window area 19. The window area 19 substantially coincides with the window area 16 on the first surface. The window area 19 shown in FIG. 2 is smaller than the window area 16, though it will be appreciated that the relative sizes and locations of the window areas 16 and 19 may be changed. In one preferred embodiment, the window areas are of the same size.

A printed layer 18 may be applied to the second surface 12 on the opposite side of the substrate in the window area 19. The printed layer 19 may form an image or images viewable through the security element structure 17. When the embossed security element structure is an array of microlenses, the printed area 19 may include a corresponding array of microimages.

In an alternative embodiment, the radiation sensitive coating may be a photosensitive polymer, with a radiation source provided at the processing station 5 for irradiating the radiation sensitive coating with patterned radiation to form an security element structure 37 (see FIG. 3) in the radiation sensitive coating. In this case, the security element structure may comprise a volume hologram, a polarising device or a liquid crystal device.

Figure 3:
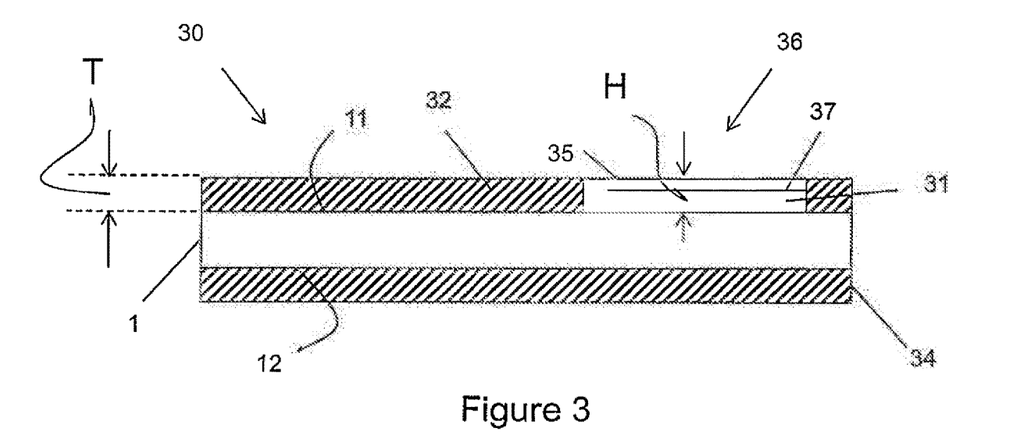
FIG. 3 is a schematic cross-section of a security document with a security element structure in the form of a volume hologram.

FIG. 3 shows a security document 30 comprising a transparent polymeric substrate 1 with a security element structure 37, such as a volume hologram, a polarising device or a liquid crystal device, formed in a radiation sensitive coating 31 applied to the first surface 11 of the substrate. An optional protective coating 35 is applied over the security element structure 37. The security element structure 37, including the optional protective coating 31, has a height H, which may typically range from about 10 µm to about 30 µm. At least one opacifying layer 32 is applied to the first surface 11 except in a window area 36 where the radiation sensitive coating 31 forming the security element 37 is applied to the first surface 11. Although only one opacifying layer 32 is shown in FIG. 3, it will be appreciated that two or more opacifying layers may be applied to the first surface as described with reference to FIG. 2. The at least one opacifying layer 32 has a thickness T.

In a preferred embodiment, the thickness T of the opacifying layer(s) 32 is preferably substantially equal to the height H of the security element structure 37 including any protective coating 35. Where there is any difference between the height H of the security element structure 37 and the thickness T of the opacifying layer(s) 32, the difference is less than 50%, preferably less than 20%, more preferably less than 15%, and even more preferably less than 10% of the height of the security element structure. The difference is preferably less than 10 µm. In a particularly preferred embodiment, the difference is less than 5 µm.

As shown in FIG. 3, at least one opacifying layer 34 is applied to the second surface 12 on the opposite side of the substrate 1 to completely cover the second surface 12 so that the security element structure is provided in a half-window.

Figure 4:
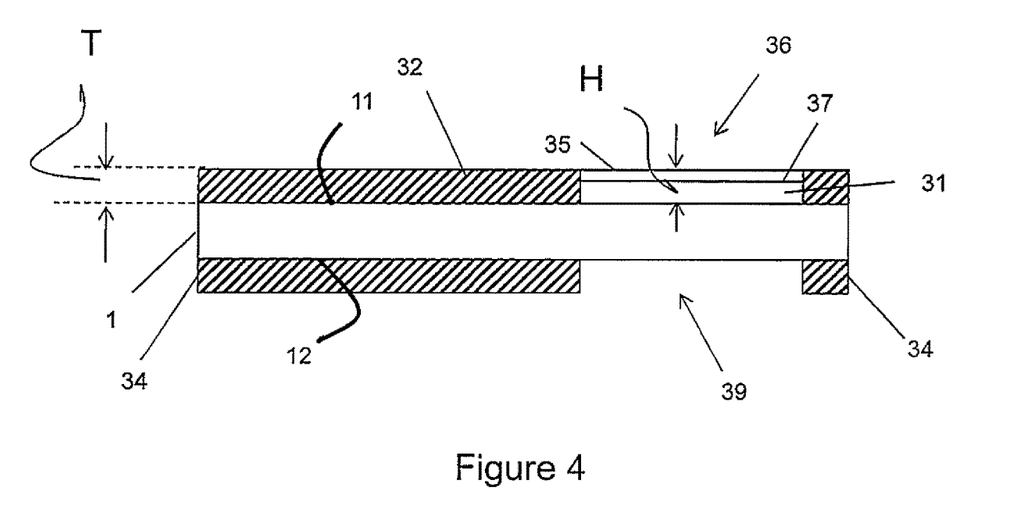
FIG. 4 is a schematic cross section of a modified security document with a security element structure in the form of a volume hologram.

FIG. 4 shows a modified embodiment similar to that of FIG. 3 and corresponding reference numerals have been applied to corresponding parts. The embodiment of FIG. 4 differs from that of FIG. 3 in that the at least one opacifying layer 34 is omitted in a window area 39. The window area 39 substantially coincides with the window area 36 on the first surface. The window area 39 shown in FIG. 4 is the same size as the window area 16, though it will be appreciated that the relative sizes and locations of the window areas 16 and 19 may be changed.

Keeping any difference between the combined thickness T of the one or more additional layers 13, 14, 15; 32 and the height H of the security element structure to less than 50%, preferably less than 20%, more preferably less than 15%, and even more preferably less than 10%, of H, and less than 10 µm, more preferably less than 5 µm, substantially reduces the localised thickness increase of the security element structure, and allows the continuous web of documents 10 to be wound onto a collection roller. Collecting the documents 10 in a substantially cylindrical roll avoids the pressure blocking and other web tension problems normally associated with the in line manufacture of documents authenticated with security element structures such as lens-based devices and volume holgrams. Similarly, security documents according to the invention can form a stack of separate sheets and maintain a substantially flat profile. This makes sheet feed systems less problematic and avoids the need to rotate equal portions of the stack by 180°.

Workers in this field will appreciate that localised thickness decreases, or recesses, in the document do not present the same drawbacks as an area of increased thickness or height. As shown in FIGS. 2 and 4, the corresponding region 19; 39 opposite the security element structure 16 has a window area 39 formed by the opacifying layer(s) 20, 21; 34 being omitted in the region of the security element structure. This window area 39 is relatively small compared to the overall security document. Stacking documents with localised recesses will not result in wedge-shaped stacks; merely small voids within the stack that are inconsequential in sheet feed systems or in line manufacturing processes. In addition, security documents manufactured in accordance with the invention also allow for more efficient stacking of the finished security documents in cash machines and cash processing machines with less need for manual intervention.

A skilled addressee will readily recognise many variations and modifications to the described embodiments, which do not depart from the spirit and scope of the broad inventive concept.

The invention claimed is:

1. A method of manufacturing a security document with a structured security element, the method comprising:
   (a) providing a document substrate having a first surface on one side and a second surface on the opposite side;
   (b) applying a radiation sensitive coating to a security element area on the first surface of the document substrate;
   (c) forming a structured security element in the radiation sensitive coating, the security element having a structure extending to a height from the first surface, such that, when a continuous web of the security documents is wound into a cylindrical roll, the roll contains areas of slack and areas of tension in the continuous web, or such that, when stacked as a plurality of separate sheets, a stack of the security documents will form a wedge shape;
   (d) applying one or more thickening layers to the first surface of the substrate, excluding the security element area, wherein the security element area is formed in a window or half window area of the document substrate, the thickening layers are opacifying coatings of ink, said application of the one or more thickening layers at least partially forms the window or half window area on the document substrate, wherein the one or more thickening layers have a combined thickness which differs from the height of the security element structure by less than 50% of the height of the security element structure and/or by less than 10 μm; and
   (e) collecting the security document as a continuous web of a plurality of security documents in a cylindrical roll or a stack of a plurality of separate sheets.

2. A method according to claim 1, wherein the combined thickness of the thickening layer or layers is equal to the height of the security element structure.

3. A method according to claim 1, further including:
   providing the document substrate as a continuous web; and
   feeding the web through a series of processing stations each including one or more roller assemblies in a machine direction for application of the radiation sensitive coating, for forming the security element structure in the radiation sensitive coating; and for application of the one or more thickening layers such that the continuous web with the security element and the thickening layers is collected downstream of the roller assemblies in a cylindrical roll.

4. A method according to claim 1, wherein the radiation sensitive coating is applied by a printing process including one or a combination of flexographic printing, gravure printing, intaglio printing or silkscreen printing.

5. A method according to claim 1, wherein the radiation sensitive coating is an embossable, curable coating which is embossed and radiation cured to form a security element with a relief structure.

6. A method according to claim 5, wherein the security element is an optically variable device (OVD) selected from a lens or other focusing structure, an array of focusing elements and/or a diffractive structure.

7. A method according to claim 1, wherein the radiation sensitive coating is a photo-sensitive coating, which is irradiated with radiation to form the security element structure including one or a combination of a volume hologram, a polarising device and/or a liquid crystal device.

8. A method according to claim 1, wherein the first surface of the document substrate is subject to an adhesion promoting process prior to the application of the radiation sensitive coating by applying an adhesion promoting layer or a primer layer to the first surface of the document substrate prior to the application of the radiation sensitive coating.

9. A method according to claim 1, wherein a protective coating is applied to the security element structure.

10. A method according to claim 1, wherein the combined thickness of the thickening layer or layers differs from the height of the security element structure by less than 20%.

11. A method according to claim 1, wherein the combined thickness of the thickening layer or layers differs from the height of the security element structure by less than 15%.

12. A method according to claim 1, wherein the combined thickness of the thickening layer or layers differs from the height of the security element structure by less than 10%.

13. A method according to claim 1, wherein the combined thickness of the thickening layer or layers differs from the height of the security element structure by less than 5 μm.

14. Apparatus for manufacturing a security document with a structured security element comprising a series of processing stations including:
   a substrate feeding station for feeding a continuous web of document substrate having a first surface on one side and a second surface on the opposite side;
   a station for applying a radiation sensitive coating to a security element area on the first surface of the document substrate;
   a security element forming station for forming a structured security element in the radiation sensitive coating, the security element comprising a structure extending to a height from the first surface such that, when a continuous web of the security documents is wound into a cylindrical roll, the roll contains areas of slack and areas of tension in the continuous web, or such that, when stacked as a plurality of separate sheets, a stack of the security documents will form a wedge shape;
   a station for applying one or more thickening layers to the first surface of the substrate, excluding the security element area, wherein the security element area is formed in a window or half window area of the document substrate, the thickening layers are opacifying coatings of ink, said application of the one or more thickening layers at least partially forms the window or half window area on the document substrate, and further wherein the one or more thickening layers have a combined thickness which differs from the height of the security element structure by less than 50% of the height of the security element structure and/or by less than 10 μm; and a station for collecting the security documents as a continuous web of a plurality of security documents in a cylindrical roll or a stack of a plurality of separate sheets.

15. Apparatus according to claim 14, wherein the radiation sensitive coating is an embossable, curable coating and the security element forming station includes an embossing station for embossing the radiation sensitive coating to form the security element having a relief structure, said security element including one or a combination of a lens, an array of focusing elements and/or a diffractive structure, and the security element forming station includes a curing station for curing the embossed radiation sensitive coating.

16. Apparatus according to claim 14, wherein the radiation sensitive coating is a photo-sensitive coating and the security element forming station includes a radiation source for irradiating the radiation sensitive coating with patterned radiation.

17. Apparatus according to claim 14 further including an adhesion promoting station for subjecting the substrate to an adhesion promoting process prior to the application of the radiation sensitive coating.

18. Apparatus according to claim 14 further including a coating applying station for applying a protective coating to the security element structure.

19. Apparatus according to claim 14, wherein one or more of the processing stations in the apparatus includes a roller assembly.

20. A security document comprising:
a document substrate having a first surface and a second surface; a structured security element positioned on a security element area of the first surface, the security element having a structure that extends to a height from the first surface such that, when a continuous web of the security documents is wound into a cylindrical roll, the roll contains areas of slack and areas of tension in the continuous web, or such that, when stacked as a plurality of separate sheets, a stack of the security documents will form a wedge shape; and
one or more thickening layers on the first surface of the document substrate excluding the security element area, wherein the security element area is formed in a window or half window area of the document substrate, the thickening layers are opacifying coatings of ink, said application of the one or more thickening layers at least partially forms the window or half window area on the document substrate, and further wherein the one or more thickening layers have a combined thickness which differs from the height of the security element structure by less than 50% of the height of the security element structure and/or by less than 10 μm,
wherein the security document forms part of one of a continuous web of a plurality of security documents in a cylindrical roll or a stack of a plurality of separate sheets.

21. A security document according to claim 20, wherein the combined thickness of the thickening layer or layers is equal to the height of the security element structure.

22. A security document according to claim 20, wherein the security element structure comprises at least one focusing element, and the at least one focusing element is selected from: an array of microlenses, diffractive lenses, Fresnel lenses and zone plates; or an array of cylindrical or part cylindrical lenses; or a microlens array in which the lens structure are spherical, part-spherical or aspherical microlenses.

23. A security document according to claim 20, wherein the security element comprises a diffractive structure, selected from a diffraction grating, a hologram or a volume hologram, or wherein the security element comprises a polarising device and/or a liquid crystal device.

24. A security document according to claim 20, wherein the document substrate is formed from a transparent or translucent polymeric material and wherein the additional layer or layers applied to the first surface of the substrate are opacifying layers which are omitted in the security element area to form a window or half window area that contains the security element, the opacifying layers comprising opacifying coatings of ink which are applied in a printing process, or layers of an opaque material, such as paper or opaque plastics material that is laminated or otherwise secured to the substrate.

25. A security document according to claim 20, wherein the combined thickness of the thickening layer or layers differs from the height of the security element structure by less than 20%.

26. A security document according to claim 20, wherein the combined thickness of the thickening layer or layers differs from the height of the security element structure by less than 15%.

27. A security document according to claim 20, wherein the combined thickness of the thickening layer or layers differs from the height of the security element structure by less than 10%.

28. A security document according to claim 20, wherein the combined thickness of the thickening layer or layers differs from the height of the security element structure by less than 5 μm.

* * * * *